United States Patent [19]
Reich

[11] 4,172,477
[45] Oct. 30, 1979

[54] GENERATION OF HIGH VACUUMS

[75] Inventor: Günter Reich, Cologne, Fed. Rep. of Germany

[73] Assignee: Leybold-Heraeus GmbH & Co. KG, Cologne, Fed. Rep. of Germany

[21] Appl. No.: 926,229

[22] Filed: Jul. 20, 1979

[30] Foreign Application Priority Data

Jul. 20, 1977 [DE] Fed. Rep. of Germany ....... 2732696

[51] Int. Cl.² .................. B65B 69/00; G01M 3/32
[52] U.S. Cl. ........................................ 141/8; 141/65; 73/49.2
[58] Field of Search ...................... 141/1–12, 141/37–66, 392, 83, 94; 73/40, 49.2

[56] References Cited

U.S. PATENT DOCUMENTS

| 2,492,075 | 12/1949 | Van Atta | 417/2 |
| 3,275,221 | 9/1966 | Holce | 417/63 |
| 3,818,752 | 6/1974 | Lindberg | 73/49.2 |

FOREIGN PATENT DOCUMENTS

| 808870 | 7/1951 | Fed. Rep. of Germany. |
| 1059144 | 11/1959 | Fed. Rep. of Germany. |
| 470589 | 5/1969 | Switzerland. |

OTHER PUBLICATIONS

Germany (Auslegeschrift) 1113283, 8/1961, Trendelenburg et al.
Germany (Offenlegungsschrift), 2015956, 10/1971, Reich.

Primary Examiner—Houston S. Bell
Attorney, Agent, or Firm—Spencer & Kaye

[57] ABSTRACT

In order to evacuate a receptacle using a pumping arrangement composed of a backing pump connected to the receptacle and a fine or high vacuum pump connected to the receptacle via a cold trap, the receptacle is initially evacuated only by operation of the backing pump, the time taken to achieve a predetermined initial pressure reduction in the receptacle only by the action of the backing pump is measured, then, on the basis of the magnitude of such pressure reduction and the measured time period, the subsequent time period which would be required, if the effect of condensable gases in the receptacle were ignored, to reach a predetermined second pressure, lower than the first pressure, in the operating range of the fine or high vacuum pump is calculated, and the receptacle is then evacuated by operation of the fine or high vacuum pump at the expiration of the subsequent time period.

9 Claims, 3 Drawing Figures

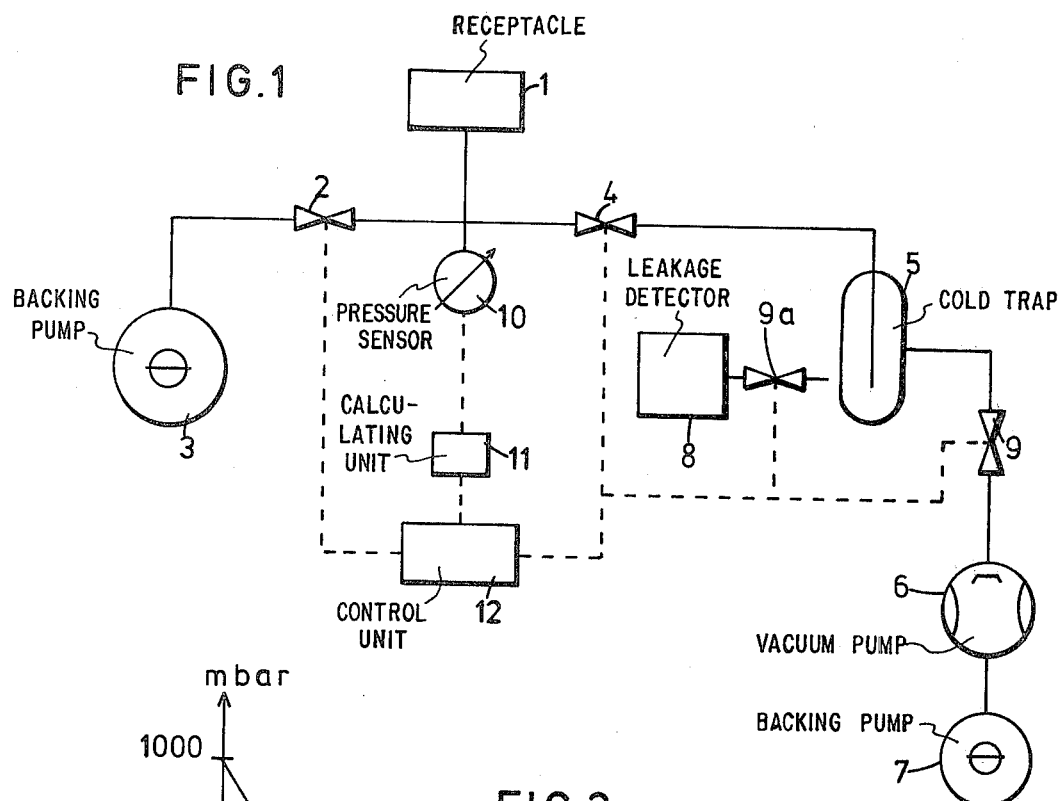
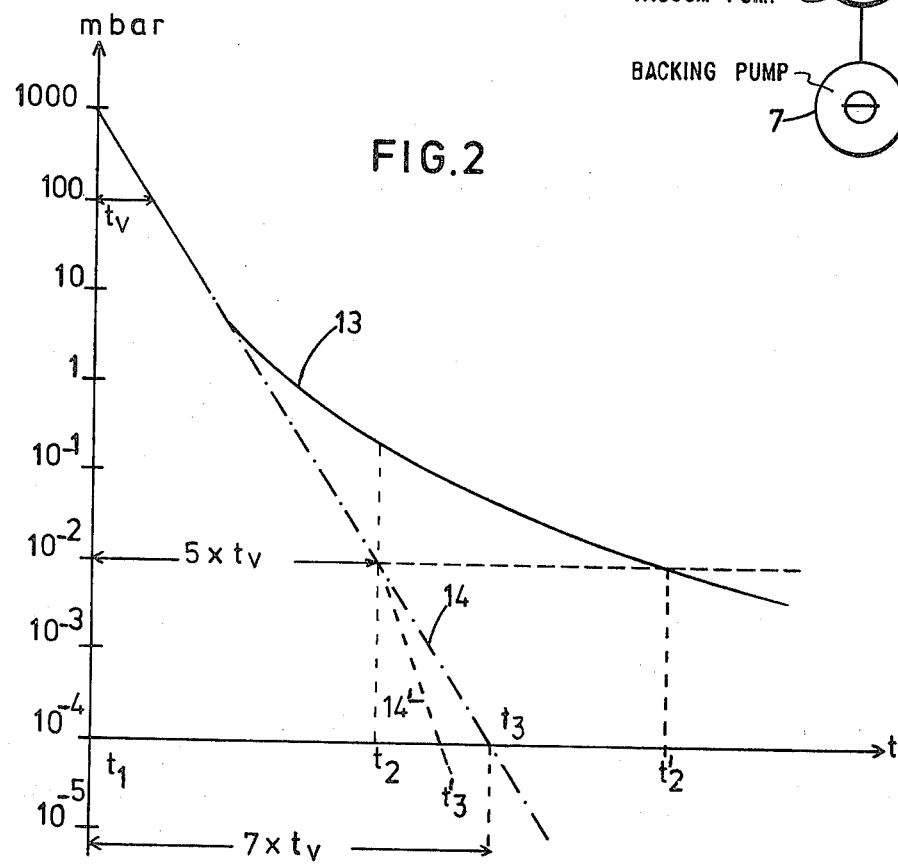

GENERATION OF HIGH VACUUMS

BACKGROUND OF THE INVENTION

The present invention relates to a method and apparatus for evacuating a receptacle using a pump arrangement consisting of a backing pump connected to the receptacle via a first valve and a fine or high vacuum pump, preferably a diffusion pump, connected in parallel with the backing pump to the receptacle via a second valve and a cold trap.

When generating a vacuum it is known to employ a plurality of differently operating pumps that are in each case particularly suitable for specific pressure ranges. Evacuation is then carried out by initially using a first pumping stage, e.g. a backing pump, to generate a pressure that lies at the upper limit of the operating range of a following pumping stage. The following pumping stage, e.g. a fine vacuum pump, is then connected, and the first pumping stage is generally disconnected. A high vacuum pump may also follow as a third pumping stage.

A known example of a multistage pumping arrangement consists of a single-stage or two-stage rotary pump cooperating with a diffusion pump. The operating range of diffusion pumps is generally below 0.2 mbar. It is therefore necessary to evacuate to a pressure in the diffusion pump operating range using the backing pump before switching over to the diffusion pump. However, it may take a relatively long time to reach this pressure since the outgassing from the internal surfaces of the vacuum system already plays a considerable role in this pressure range. In this connection, there are generally present condensable gases which condense at elevated pressures on the surfaces and are retained thereon by absorption forces. At higher pressure ranges, i.e. above 50 mbar, outgassing therefore hardly plays any role, with the result that the pressure behavior, when plotted logarithmically against time, corresponds to a straight line. However, below 50 mbar the outgassing increasingly influences the pressure behavior, with the result that the logarithm of pressure vs. time deviates from a straight line after prolonged periods. In addition, the efficiency of rotary pumps is reduced in this pressure range.

It is known to connect a cold trap in front of the high vacuum pumps, in particular the diffusion pumps, and to maintain the cold trap at a relatively low temperature, for example at the temperature of liquid nitrogen. This cold trap is not only intended to prevent oil vapors from the diffusion pump from penetrating into the vacuum system, but over and above this has a high pumping capacity for gases that condense, for example at the temperature of liquid nitrogen, with the result that the condensable gases, e.g. water vapor, present in the vacuum system are suctioned off by this condensation pump. The result is that in the pumping regions in which outgassing from the internal surfaces already plays a role, the pressure between the cold trap and the diffusion pump is lower than the pressure in the receptacle.

When using a cold trap, the transition from the backing pump to the subsequent fine or high vacuum pump may thus be effected after a fairly short pumping time, and accordingly the pumping time would be reduced as a result of the earlier connection of the fine or high vacuum pump. Such a method is especially of great advantage if, when carrying out hermetic sealing tests, a test chamber must be evacuated as quickly as possible, and in fact down to a pressure that is so low that the hermetic sealing tests can be carried out using mass spectrometers, which require a pressure of less than $10^{-4}$ mbar.

In this context it would therefore be desirable to increase the value of the pressure at which the switchover is carried out in order to obtain the described advantage. However, this is generally not possible, since the afore-mentioned deviation of the actual pressure variation during evacuation from a straight line is not reproducible in the pressure ranges in which outgassing plays a considerable role. The pressure variation during evacuation depends on many parameters, such as atmospheric moisture, cleanliness of the system and test specimen, surface area, temperature, and the like. The possible reduction in the total pumping time by using a cold trap was therefore not previously exploited by earlier connection of the fine or high vacuum pump.

SUMMARY OF THE INVENTION

It is therefore an object of the present invention to effect evacuation of a receptacle using a pumping arrangement consisting of a backing pump connected to the receptacle via a first valve and a fine or high vacuum pump, preferably a diffusion pump, connected in parallel with the backing pump and to the receptacle via a second valve and a cold trap, in a manner to achieve a considerable reduction in the overall pumping time.

This and other objects are achieved, according to the invention, by the following operating sequence:

In a manner known per se, the first valve is opened at the beginning of the evacuation, while the second valve remains closed, with the result that the evacuation is initially carried out only by means of the backing pump; during this pumping phase a time is measured, e.g. by means of a microprocessor, in which a specific predetermined pressure reduction is achieved; a time $t_2$ is then calculated depending on this pressure-time relationship and with the aid of the microprocessor, at which, without taking into account condensable gases in the receptacle a pressure would be achieved at which it would be possible to switch over to the fine or high vacuum pump; the fine or high vacuum pump is then switched on at this point in time $t_2$.

The switching to the second pumping stage thus takes place at a time at which, because of the presence of the condensable gases, there is a pressure acting in the receptacle that would still not permit the connection to the fine or high vacuum pump per se. Since, however, the cold trap is situated ahead of the fine or high vacuum pump and the condensable gases are suctioned off by the cold trap, the connection to the fine or high vacuum pump may already take place. The essential point is that in this way it is possible to switch over to the second pumping stage in each case at the earliest possible time independently of the existing state and the size of the vessel, with the result that the minimum necessary pumping time can be achieved in each case.

If, for example, in the pre-evacuation phase the time that elapses until the pressure has fallen from 1000 to 100 mbar is measured, then by extrapolating the known linear behavior of the pressure-time characteristic, the point in time can be calculated at which, for example, a pressure of $10^{-2}$ mbar would be obtained if no condensable gases were present. In this example this is five times the time required by the backing pump to evacuate the receptacle from 1000 to 100 mbar.

After this time, calculated automatically for example by microprocessors or minicomputers, the fine or high vacuum pump can be switched on safely since the cold trap absorbs the condensable gases producing the higher pressure in the receptacle and thus protects the second pumping stage against unacceptably high pressures.

If three pumping stages are provided, for example a backing pump, a fine vacuum pump and a high vacuum pump, then the connection of the third pumping stage can of course be carried out in a similar manner. Using a microprocessor, a further time $t_3$ can be calculated as a function of the measured pressure-time characteristic, at which time $t_3$, without taking into account condensable gases, a pressure would be reached that would enable the third pumping stage to be placed into operation, likewise connected to the receptacle via the, or another, cold trap and a a third valve. The third pumping stage, which may for example be a high or ultra-high vacuum pump, will then be connected at this point in time $t_3$, and will therefore be connected at the earliest possible time.

A leakage detector may also be connected in a similar manner at the earliest possible time. The microprocessor then calculates the point in time at which, without taking into account condensable gases, the leakage detector can be connected. The leakage detector protected by the cold trap can then be connected at this point in time even though a fairly high pressure still prevails in the receptacle. The only point that should be borne in mind in this connection is that with the preceding connection of the high vacuum pump an altered pumping capacity may arise, with the result that the slope of the linear progression of the pressure-time characteristic will change when the high vacuum pump is connected.

BRIEF DESCRIPTION OF THE DRAWING

FIG. 1 is a schematic view of a preferred embodiment of an evacuation arrangement according to the invention provided with two pumps.

FIG. 2 is a pressure vs. time diagram illustrating the operational method according to the invention.

DESCRIPTION OF THE PREFERRED EMBODIMENTS

Figure 3:
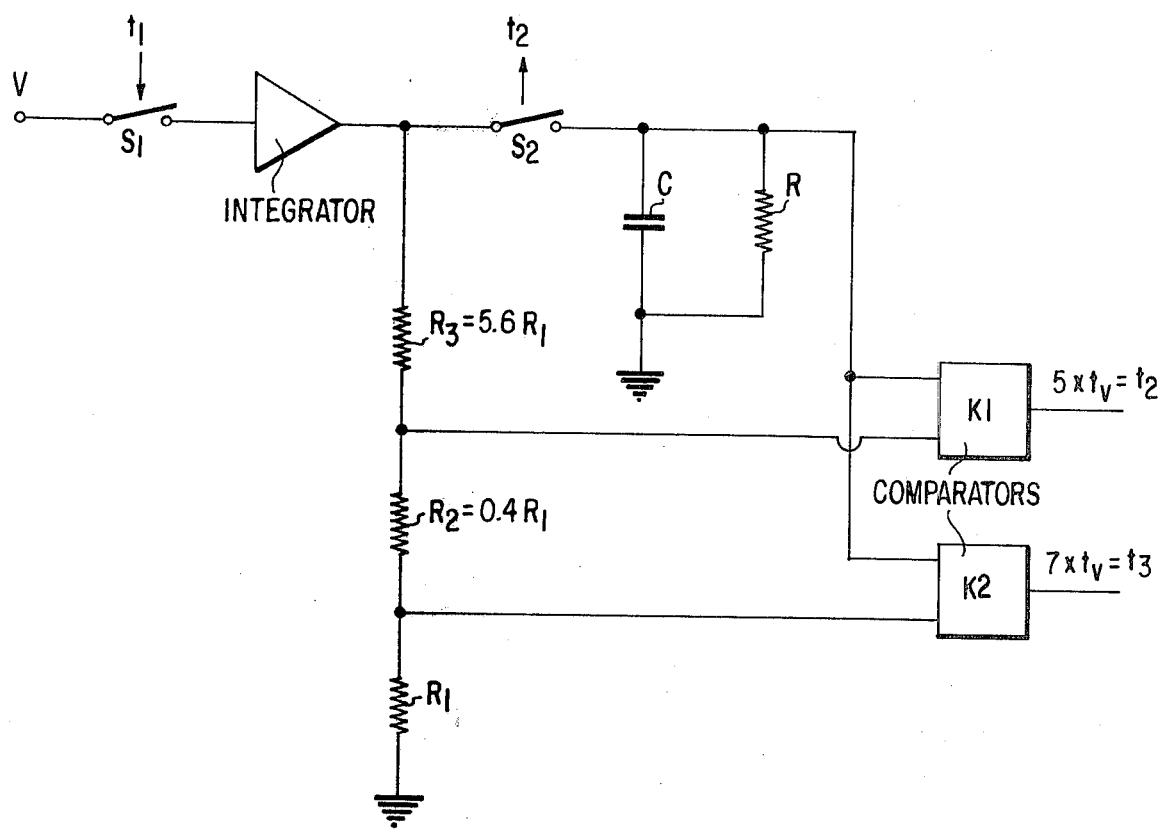
FIG. 3 shows an example of a circuit for generating points of time in the derived manner.

FIG. 1 shows a system for evacuating a receptacle 1, the system including a backing pump 3, which is for example a rotary piston vacuum pump, connected to the receptacle via a first valve 2. A cold trap 5 and, subsequently, a high vacuum pump 6, preferably a diffusion pump, are connected, in parallel with the backing pump, to receptacle 1 via a second valve 4. A backing pump 7, in the form of a rotary piston pump, cooperates with the diffusion pump. It is however also possible to connect the diffusion pump 6 to the backing pump 3.

Using the illustrated arrangement, leakage tests can be carried out on test specimens introduced into the receptacle 1. A leakage detector 8 is connected to the cold trap 5, and in the case of a leak the test gas penetrating through the leak is recorded with the detector. It is also possible to connect the detector 8 to the line between the cold trap 5 and the high vacuum pump 6. A further cold trap is however necessary in front of the diffusion pump when such a pump is used as the high vacuum pump. A further valve 9 is provided between the cold trap 5 and the diffusion pump 6, and can be closed during the actual leakage test if it is intended to carry out the leakage test according to the "accumulation principle", i.e. if all the gas flowing from the receptacle 1 during the leakage test is to be conveyed to the detector 8. Finally, a valve 9a is inserted in front of the leakage detector 8 and enables the leakage detector to be connected subsequently at a pressure that is appropriate for this purpose.

A measuring instrument 10 is provided for measuring the pressure in the receptacle 1. This instrument emits electrical signals corresponding to the pressure values, the signals being delivered to a minicomputer or microprocessor 11. Using the signals provided by this processor, the valves 2 and 4 and, as provided for in the example suitable for the leakage test, the valves 9 and 9a are regulated by a control device 12.

The operational method for evacuating the receptacle 1 according to the invention is illustrated by means of the diagram shown in FIG. 2, in which the pressure in mbar is plotted logarithmically against the time t.

After a test sample has been placed in the receptacle 1, the latter is closed and sealed and both valves 2 and 4 are initially closed. Then, at a time $t_1$ and at a pressure in the receptacle of about 1000 mbar, the evacuation of the receptacle 1 is commenced by operating the backing pump 3 and opening the valve 2. During this first pumping phase, the pressure progresses in a manner corresponding to the linear part of the curve 13 in FIG. 2. Using the microprocessor 11, the time $t_v$ necessary for the pressure in the receptacle 1 to fall for example from 1000 to 100 mbar is measured. This time is multiplied by a specific factor, and in fact in the present case for example by the factor five. This gives a point in time $t_2$ at which backing pump 3 would create a pressure of $10^{-2}$ mbar if no condensable gases were present in the vacuum system. This corresponds to an evacuation process following the dot-dash extension 14 of the straight part of the curve 13. In fact however, the pressure in the receptacle varies by about 1 mbar from the straight line and actually approximately follows the curved part of the curve 13. This deviation is however not accurately repeatable and may be different with each pumping procedure.

At time $t_2 - t_1 = 5 \times t_v$ the microprocessor 11 delivers a signal to the control device 12 which causes the cold trap 5 together with the diffusion pump 6 to be connected to the receptacle, i.e. the valves 4 and 9 are opened and if necessary the valve 2 is closed. If there is no valve 9 then it is sufficient to open valve 4. Although in the receptacle 1 at the time $t_2 = 5 \times t_v$ the pressure is still too high for the diffusion pump 6 to be effective, the connection of the latter can already take place since the unsuitably high pressure is due only to the condensable gases still present in the receptacle 1, and these are however absorbed in the cold trap 5, with the result that the pressure prevailing in the lines behind the trap is suffiently low.

Hitherto the connection of the high vacuum pump took place only at the time $t'_2$, which, depending on the course of the curve 13, is considerably later than $t_2$. The method according to the invention thus provides a considerable reduction in the total pumping time.

The connection of the leakage detector 8 cannot yet be made at $10^{-2}$ mbar if the leakage test is carried out using a mass spectrometer. The valve $9a$ thus remains still closed at the moment when the valves 4 and 9 are opened. If the pumping capacity remains the same after connecting the high vacuum pump at time $t_2$, then a suitable pressure for connecting the mass spectrometer-leak detector is reached at time $t_3 = 7 \times t_v$, without taking into account condensable gases. This time can also be calculated by the microprocessor 11, with the result that the leakage detector 8 can be connected at the earliest possible time using the control device 12 and by opening the valve 9a, although a fairly high pressure still exists in the receptacle 1.

If the pumping capacity is altered by the prior connection of the high vacuum pump 6, then the slope of the linear progression of the pressure-time characteristic also changes. If the pumping capacity is greater, the curve becomes steeper. An example of this is shown by curve 14' in FIG. 2. The curve 14' determines a time $t'_3$ at which the connection of the leakage detector 8 can be effected.

It is thus always possible, on the basis of the knowledge of the time $t_v$ and the ratio of the pumping capacities of the various pumping stages, to calculate accurately in advance the times at which, on the one hand, a fine and/or high vacuum pump can be connected, and, on the other hand, in the case of a leakage test, the time at which the leakage detector can be connected. This happens in each case at the earliest possible time, with the result that considerable time savings can be achieved.

As shown in FIG. 3 unit 11 can alternatively be constructed in analog form. The circuit functions as followed: At $t_1$ the switch $S_1$ closes. Switch $S_2$ is closed. The output voltage of the integrator rises. The condensor C is loaded. At $t_2$ switches $S_1$ and $S_2$ open. Condensor C is then unloaded via R, while the output voltage of the integrator remains constant. The comparators $K_1$ and $K_2$ determine the time, at which the voltage of the condensor drops under the value of the voltages between the resistors $R_1$, $R_2$, $R_3$. These points of time can be used for controlling the valves 2, 4, 9, 9a along the lines of the invention.

It will be understood that the above description of the present invention is susceptible to various modifications, changes and adaptations, and the same are intended to be comprehended within the meaning and range of equivalents of the appended claims.

What is claimed is:

1. A method for evacuating a receptacle using a pumping arrangement composed of a backing pump connected to the receptacle and a fine or high vacuum pump connected to the receptacle via a cold trap, comprising: initially evacuating the receptacle only by operation of the backing pump; measuring the time taken to achieve a predetermined initial pressure reduction in the receptacle only by the action of the backing pump; calculating, on the basis of the magnitude of such pressure reduction and the measured time period, the subsequent time period which would be required, if the effect of condensable gases in the receptacle were ignored, to reach a predetermined second pressure, lower than the first pressure, in the operating range of the fine or high vacuum pump; and evacuating the receptacle by operation of the fine or high vacuum pump at the expiration of the subsequent time period.

2. A method as defined in claim 1 wherein the pumping arrangement further includes a further pump connected to the receptacle via a cold trap, and further comprising: calculating a further time period which would be required, if the effect of condensable gases in the receptacle were ignored, to reach a predetermined third pressure, lower than the second pressure, in the operating range of the further pump; and evacuating the receptacle by operation of the further pump at the expiration of the further time period.

3. Apparatus for evacuating a receptacle comprising: a backing pump; a fine or high vacuum pump; a cold trap connected by a line to the suction side of said vacuum pump; means selectively connecting at least one of said pump and said cold trap to the receptacle; and control means connected for determining the time taken to effect a predetermined pressure reduction in the receptacle by operation of only said backing pump, and for selectively connecting said vacuum pump to effect evacuation of the receptacle starting at a time after beginning of the predetermined pressure reduction which is a selected multiple of the determined time.

4. An arrangement as defined in claim 3 wherein said connecting means comprise a plurality of valves each connected between said receptacle and a respective pump, and said control means are arranged to open and close each said valve to control operation of its associated pump.

5. An arrangement as defined in claim 4 further comprising an additional value connected between said cold trap and said vacuum pump.

6. An arrangement as defined in claim 4 further comprising: a leakage detector; and a controllable valve connected between said detector and the line between said cold trap and vacuum pump.

7. An arrangement as defined in claim 4 further comprising: a leakage detector; and a controllable valve connected between said detector and said cold trap.

8. A method for operating the apparatus defined in claim 6 or 7 in order to effect leakage detection, comprising: calculating, in said control means, the time at which, if the effect of condensable gases in the receptacle were ignored, a pressure would be reached in the receptacle that would enable said detector to be connected; and opening said controllable valve at such time in order to connect said leakage detector.

9. A method as defined in claim 8, wherein the apparatus has an additional valve connected between said cold trap and said vacuum pump, and further comprising closing said additional valve simultaneously with opening of said controllable valve.

* * * * *